United States Patent

Down

[15] 3,675,626

[45] July 11, 1972

[54] METHOD FOR GROWING OYSTERS

[72] Inventor: Russell J. Down, Holmes Landing Road, Cape May Court House, Cape May County, N.J. 08210

[22] Filed: June 9, 1970

[21] Appl. No.: 44,776

[52] U.S. Cl. ..................................................... 119/4
[51] Int. Cl. ............................................... A01k 61/00
[58] Field of Search ......................................... 119/4

[56] References Cited

UNITED STATES PATENTS

| 3,294,062 | 12/1966 | Hanks .................................. 119/4 |
| 3,552,357 | 1/1971 | Quayle ................................. 119/4 |
| 1,815,521 | 7/1931 | Miyagi ................................. 119/4 |
| 3,029,785 | 4/1962 | Maheo .................................. 119/4 |
| 3,294,061 | 12/1966 | Hanks .................................. 119/4 |
| 3,347,210 | 10/1967 | Golub .................................. 119/4 |

FOREIGN PATENTS OR APPLICATIONS

| 1,443,265 | 5/1966 | France ................................ 119/4 |
| 1,362,046 | 4/1964 | France ................................ 119/4 |

*Primary Examiner*—Aldrich F. Medbery
*Attorney*—Paul & Paul

[57] ABSTRACT

A method of growing oysters on annular rings by first placing and vertically suspending the rings on a horizontal support in an oyster seed growing marine habitat, than suspending the rings horizontally on support lines in a vertical stack where the oysters grow to maturity.

1 Claim, 3 Drawing Figures

PATENTED JUL 11 1972 3,675,626

INVENTOR.
RUSSELL J. DOWN
BY
*Paul + Paul*
ATTORNEYS.

METHOD FOR GROWING OYSTERS

BACKGROUND OF THE INVENTION

This invention relates to devices and methods for use in growing oysters and the like, and more particularly relates to a device which is adaptable for use in seeding areas whereby oyster seeds will implant themselves naturally on the material of this device and then the device can be removed to an oyster growing area and expanded to accommodate the maturing oysters.

In the prior art rather cumbersome and complicated devices such as that shown in U.S. Pat. No. 3,347,210 granted Oct. 17, 1967 have been used in an attempt to make an artificial means for growing oysters. These devices are bulky and difficult to use and transport, and are relatively inefficient insofar as the space required by them is concerned.

SUMMARY OF THE INVENTION

I have invented a new device for growing oysters comprising a plurality of substantially flat rings arranged by preferably flexible means in a vertical column. I disclose herein a new method for growing oysters and the like, most preferably using such a device.

Accordingly, it is an object of my invention to provide a new means and method for growing oysters which will increase the oyster productivity per acre.

It is a further object of my invention to provide an inexpensive easy to use apparatus for the growing of oysters, which apparatus is adaptable to be deposited in oyster seeding areas and which will permit accumulation of oyster seeds by natural processes in the seeding areas.

These and other objects of my invention will become apparent from the following description with reference to the accompanying drawings.

DESCRIPTION OF THE PREFERRED EMBODIMENTS

Figure 2:
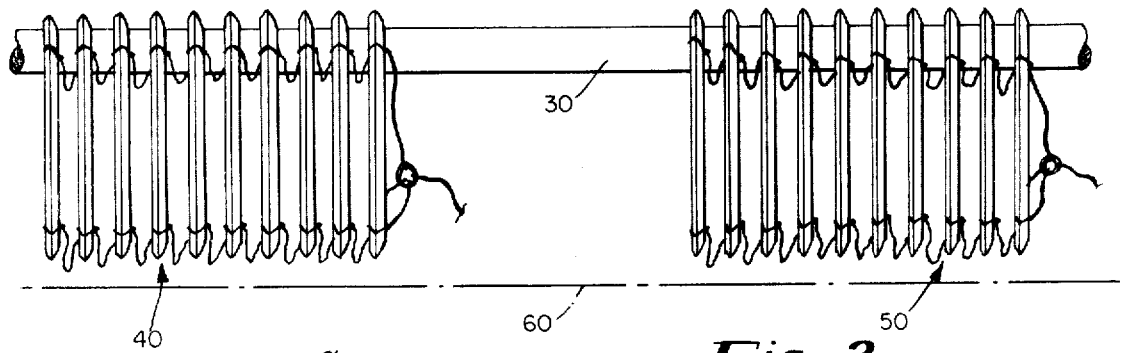
FIG. 2 shows the device of FIG. 1 in an alternate position, in elevation.

Although specific forms of the invention have been selected for illustration in the drawings, and the following description is drawn in specific terms for the purpose of describing these forms of the invention, this description is not intended to limit the scope of the invention which is defined in the appended claims.

Figure 1:
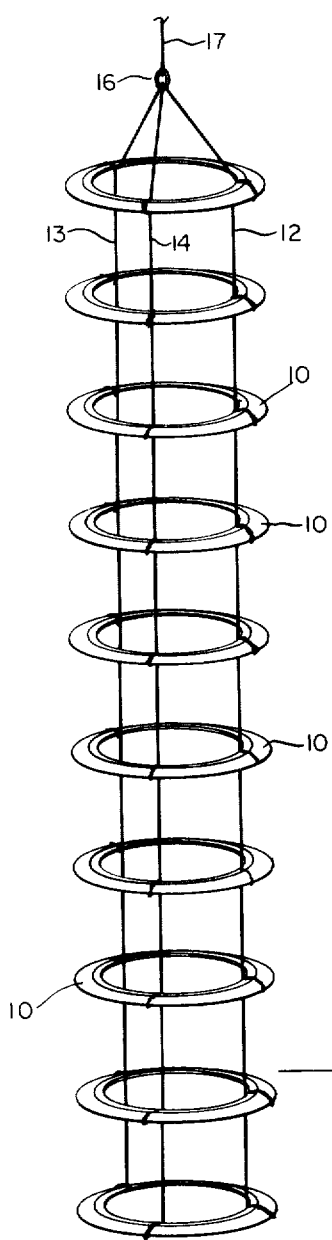
FIG. 1 is a perspective view of a device in accordance with my invention shown fully opened in the operative position for growing oysters.
Figure 3:
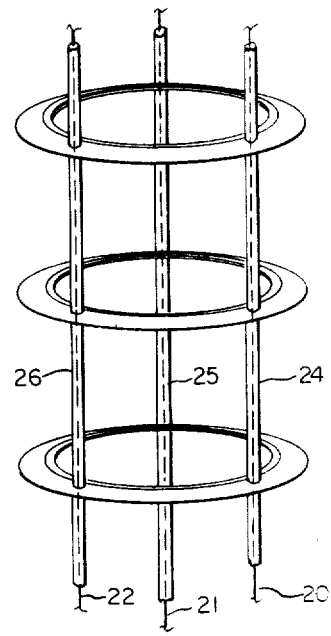
FIG. 3 is a perspective view of an alternate embodiment of my invention.

In FIG. 1 there is shown a plurality of annular bodies 10 suspended in a vertical column by means of interconnecting lines. These annular bodies are rims most preferably made of the inner most annular portions of vehicle tires. These portions include the bead of the tire and a portion of the side wall of the tire together with the metal wire ring contained within the bead. The rims disclosed in U.S. Pat. No. 3,347,210, in FIG. 3 are reduced to the point in which they are almost a circular or square cross section about the inner wire. However, in accordance with my invention it is desirable to include in the rim a greater portion of the wall of the tire so that the ring so formed by the rim extends outwardly preferably two to three inches. This provides a greater surface area for the oyster seeds to affix themselves.

Alternatively, a rim could include up to half of the vehicle tire. (The half being obtained by dividing the tire on a plane perpendicular to its axis). Further, the tires normally include an internal configuration including ribs or the like which form a plurality of radially extending beads. These together with the circumferentially extending beads provide a base upon which the oyster larvae readily set. Accordingly, while the preferred annular rim is substantially in a flat plane, it is in fact slightly convexed or curved in section and this also promotes the setting of the oyster larvae.

The steel wires which run through the tire rims and which are covered by a vulcanized rubber provide a rigid structure which is at once durable and resists salt water induced corrosion and is not readily attacked by marine organisms such as borers which destroy shell cultch. Cultch are the hard surfaces normally used for seeding oysters.

The extended side wall portion of the rim provides a flexible bed making it easier to remove the grown oysters without destroying the rim.

The tire rim cultch does not break from normal wave action, nor will it cut the supporting lines as do strung surf clam or oyster shells.

Further, the uniform shape and greater surface area provided in accordance with my invention allows a more complete use of the water space in which the oysters are to be grown.

In accordance with my invention the entire water column may be used to grow oysters. In this regard it is desirable to space the tire rims from five to seven inches apart to allow for the growth of the oysters.

This spacing is accomplished in several ways, the most preferably being shown in FIG. 1. Therein a plurality of lines 12, 13 and 14 made most preferably of braided polyprophylene rope are looped around each rim and the rope is most preferably either knotted or fed through itself in the manner of a braid so that the rims are held at predetermined positions on the rope. Three such ropes are preferable at equally spaced intervals around the tire rim and any number of rims may be so secured together depending on the contemplated depth at which they will be hung. The three ropes are joined together and secured at the top on a ring 16 or other suitable support means.

Cedar poles or creosote beams or rafts or the like (not shown) can be used for suspension of the columnar devices (as by a rope 17 attached to the ring 16) which are hung vertically in the channels in the ocean areas used for the growing of clams or oysters.

As an alternate to connecting the tire rims by rope, spacers may be used either in conjunction with the rope or with a metal cable passing through the tire rims. A portion of such a device is shown in perspective in FIG. 3 wherein three such steel cables 20, 21 and 22 are used in place of the ropes and passed through a plurality of small holes at equally spaced intervals about the tire rim. Between each set of rims, a plurality of rigid plastic tubes (such as at 24, 25 and 26) on the order of an inch in diameter and five to seven inches long are disposed about the cables to form a means for spacing. The wires are suitably fixed to the last or bottom most rim in the set by means of crimping, tying or any other suitable means so that they are fixedly connected to the last rim. The wires are connected at the top to a loop for support in the growing position. This alternative structure lacks the axial flexibility of the preferred embodiment.

A distinct advantage is provided in the preferred embodiment over the structure of the prior art and, in particular, of the prior art patent mentioned above. In accordance with my invention the flexible column of rings 10 is axially collapsable and this is of particular advantage in the seeding of the oysters. A wooden pole 30 or rod or the like can be suspended as shown in FIG. 2 through the center holes of the assembled tire rim stacks 40 and 50. This pole can then be placed horizontally and supported off the bottom 60 below the water surface for collection of seed oysters. In FIG. 2, a plurality of stacks of rings are shown and the rims are spaced slightly from one another in order to accommodate the oyster seeds. Further, maximum use of the oyster seed bed can be obtained by such a method which allows the seeding means to be disposed in very close proximity to one another creating a means for high density seeding. Also fewer supporting structures are needed when these rings are set out for collection of seed oysters.

This means and method of seeding has an added advantage where the seeding and growing areas are separate, in that the tire rim stacks are easily handled and transported.

Once seeding has taken place and the oyster seeds grown to spat size, the stacks can be transported to the growing grounds and suspended from the structures mentioned above or from guide lines strung between buoys or the like and the oyster spat is grown to fully mature oysters on the cultch rings.

The flexibility of the cultch tire rims makes separation of the oysters from the cultch and from each other prior to shucking easier then when shell cultch is used. Once harvesting has been completed without damaging the cultch tire rim rings, the tire rim stacks may be reused whereas in the prior art the strung shell cultch is destroyed upon harvest of the oysters from the cultch.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. A method for high density setting, growing and harvesting oysters including the steps of attaching a plurality of support lines to spaced portions of the edge portion of a plurality of annular cultch rings; placing a horizontal support member through the holes in said annular rings to suspend the rings in a vertical pendent position; closely spacing the pendant rings from each other on said support;

placing and supporting the rings and their horizontal support in an oyster seed spat growing marine habitat, adjacent to but spaced away from the bottom or ground surface; permitting the oyster cultch seeds to become attached to said rings and start to grow to spat size; removing the rings and spat from said horizontal support; transporting the rings to a suitable marine oyster growing grounds; suspending the rings from their support lines in horizontal spaced positions to hang in a vertical stack so that each ring is spaced from its adjacent ring by said support lines a distance substantially greater than said closely spaced positions; permitting the oyster spat to grow to maturity; removing the vertical stacks and oysters from the water, harvesting the grown oysters from the rings without destroying the rings, and then repeating the forgoing steps with the entire assembly of rings intact.

* * * * *